US012258848B2

(12) United States Patent
Zhang et al.

(10) Patent No.: US 12,258,848 B2
(45) Date of Patent: Mar. 25, 2025

(54) LOW-PRESSURE LIQUID INLET MANIFOLD AND FRACTURING APPARATUS

(71) Applicant: YANTAI JEREH PETROLEUM EQUIPMENT & TECHNOLOGIES CO., LTD., Shandong (CN)

(72) Inventors: Rikui Zhang, Shandong (CN); Haiping Cui, Shandong (CN); Tianqiang Di, Shandong (CN); Peng Zhang, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 461 days.

(21) Appl. No.: 17/572,443

(22) Filed: Jan. 10, 2022

(65) Prior Publication Data

US 2022/0228469 A1 Jul. 21, 2022

(30) Foreign Application Priority Data

Jan. 21, 2021 (CN) ......................... 202110080048.8
Jul. 28, 2021 (CN) ......................... 202110859620.0
Jul. 28, 2021 (CN) ......................... 202121733037.7

(51) Int. Cl.
*E21B 43/26* (2006.01)
*F15B 1/02* (2006.01)
*F04B 11/00* (2006.01)

(52) U.S. Cl.
CPC ....... *E21B 43/2607* (2020.05); *F04B 11/0008* (2013.01); *F15B 2201/40* (2013.01)

(58) Field of Classification Search
CPC .............. F04B 11/0008; E21B 43/2607; F15B 2201/40
See application file for complete search history.

(56) References Cited

U.S. PATENT DOCUMENTS 10,151,414 B2 * 12/2018 Micken .................. F16L 41/02

FOREIGN PATENT DOCUMENTS

CN 103883494 B 1/2016
CN 204941508 U 1/2016
(Continued)

OTHER PUBLICATIONS

Translation of CN 111219326 A (Year: 2020).*
(Continued)

*Primary Examiner* — Connor J Tremarche
(74) *Attorney, Agent, or Firm* — Crowell & Moring LLP

(57) ABSTRACT

A low-pressure liquid inlet manifold and a fracturing apparatus are disclosed. The low-pressure liquid inlet manifold includes a main liquid inlet pipe and N liquid feeding pipes; the N liquid feeding pipes are arranged in sequence; each of the liquid feeding pipes includes a third end and a fourth end, the third end is communicated with the main liquid inlet pipe, and the fourth end is configured to provide low-pressure liquid to a plunger pump; and the low-pressure liquid inlet manifold further includes at least one auxiliary accumulator, which is connected with the main liquid inlet pipe and is arranged corresponding to at least one of the N liquid feeding pipes, an orthographic projection of the auxiliary accumulator on an axis of the main liquid inlet pipe overlaps with an orthographic projection of a corresponding liquid feeding pipe on the axis.

20 Claims, 5 Drawing Sheets

(56) References Cited

FOREIGN PATENT DOCUMENTS

| | | | | | |
|---|---|---|---|---|---|
| CN | 205503376 | U | | 8/2016 | |
| CN | 205936563 | U | | 2/2017 | |
| CN | 205937080 | U | * | 2/2017 | |
| CN | 206111159 | U | | 4/2017 | |
| CN | 206723028 | U | | 12/2017 | |
| CN | 207030807 | U | | 2/2018 | |
| CN | 207747543 | U | | 8/2018 | |
| CN | 209654209 | U | | 11/2019 | |
| CN | 209971150 | U | | 1/2020 | |
| CN | 210195950 | U | | 3/2020 | |
| CN | 111077281 | A | | 4/2020 | |
| CN | 111219326 | A | * | 6/2020 | ............. E21B 43/26 |
| CN | 211692342 | U | | 10/2020 | |
| CN | 212360145 | U | | 1/2021 | |

OTHER PUBLICATIONS

Translation of CN 205937080 U (Year: 2017).*
Cunde, Fan, Editor; Hydraulic Technical Manual; with English translation, 25 pages, published May 2004.
1st Office Action dated May 29, 2024 for Chinese Patent Application No. 202110859620.0; 9 pages.

* cited by examiner

LOW-PRESSURE LIQUID INLET MANIFOLD AND FRACTURING APPARATUS

CROSS REFERENCES TO RELATED APPLICATIONS

The present application claims the priority of the Chinese patent application No. 202110080048.8 filed on Jan. 21, 2021, the Chinese patent application No. 202110859620.0 filed on Jul. 28, 2021 and the Chinese patent application No. 202121733037.7 filed on Jul. 28, 2021, for all purposes, the disclosure of which is incorporated herein by reference in its entirety as part of the present application.

TECHNICAL FIELD

Embodiments of the present disclosure relate to a low-pressure liquid inlet manifold and a fracturing apparatus.

BACKGROUND

In the field of oil and natural gas exploitation, fracturing technology is a method of using high-pressure fracturing fluid to form cracks in oil and gas layers. The fracturing technology improves underground flow environment of oil and gas by making cracks in the oil and gas layers, so that the production of oil wells can be increased, thus the fracturing technology is widely used in exploitation of conventional and unconventional oil and gas, and development of offshore and onshore oil and gas resource.

A fracturing apparatus usually includes a plunger pump, a low-pressure liquid inlet manifold and a high-pressure discharge manifold; the low-pressure liquid inlet manifold provides low-pressure fluid to the plunger pump, the plunger pump uses the reciprocating movement of a plunger in a fluid end chamber to pressurize the low-pressure fluid, and the pressurized high-pressure fluid is discharged through the high-pressure discharge manifold, so that the pressurized high-pressure fluid can be used for fracturing of oil and gas layers.

SUMMARY

Embodiments of the present disclosure provide a low-pressure liquid inlet manifold and a fracturing apparatus, by means of arranging at least one auxiliary accumulator corresponding to at least one of the N liquid feeding pipes on the main liquid inlet pipe, the low-pressure liquid inlet pipe can ensure stability of liquid supply pressure of the corresponding liquid feeding pipe in the case where pressure of the fluid in the main liquid inlet pipe is insufficient or fluctuates, so that the problem of fracturing air suction is avoided, and thus the service life and performance of the plunger pump can be improved. On the other hand, the auxiliary accumulator can play a role of preventing sand deposition to a certain extent. Therefore, the low-pressure liquid inlet manifold can further alleviate or even eliminate the problem of sand deposition.

At least one embodiment of the present disclosure provides a low-pressure liquid inlet manifold, which includes: a main liquid inlet pipe, including a first end and a second end that are arranged opposite to each other in an extension direction of the main liquid inlet pipe; N liquid feeding pipes, arranged in sequence along a direction from the first end to the second end; each of the liquid feeding pipes includes a third end and a fourth end that are arranged opposite to each other in an extension direction of the each of the liquid feeding pipes, the third end is communicated with the main liquid inlet pipe, and the fourth end is configured to provide low-pressure liquid to a plunger pump; and the low-pressure liquid inlet manifold further includes at least one auxiliary accumulator, the at least one auxiliary accumulator is connected with the main liquid inlet pipe and is arranged corresponding to at least one of the N liquid feeding pipes, an orthographic projection of the auxiliary accumulator on an axis of the main liquid inlet pipe overlaps with an orthographic projection of a corresponding liquid feeding pipe on the axis, and N is a positive integer greater than or equal to 2.

For example, in the low-pressure liquid inlet manifold provided by an embodiment of the present disclosure, the low-pressure liquid inlet manifold includes N−1 auxiliary accumulators, and the N−1 auxiliary accumulators are sequentially arranged along the direction from the first end to the second end; and, in the direction from the first end to the second end, a first one of the N liquid feeding pipes is arranged corresponding to a first one of the N−1 auxiliary accumulators, an i-th one of the N liquid feeding pipes is arranged corresponding to an i-th one of the N−1 auxiliary accumulators, an (N−1)-th one of the N liquid feeding pipes is arranged corresponding to an (N−1)-th one of the N−1 auxiliary accumulators, and i is a positive integer greater than 1 and less than N−1.

For example, the low-pressure liquid inlet manifold provided by an embodiment of the present disclosure further includes: an end auxiliary accumulator, wherein the end auxiliary accumulator is connected with the main liquid inlet pipe and is arranged corresponding to the N-th one of the N liquid feeding pipes, and an orthographic projection of the end auxiliary accumulator on the axis of the main liquid inlet pipe overlaps with an orthographic projection of the N-th one of the N liquid feeding pipes on the axis.

For example, the low-pressure liquid inlet manifold provided by an embodiment of the present disclosure further includes: a deflecting inclined plate, located at the second end and at least partly located in the main liquid inlet pipe, an orthographic projection of the deflecting inclined plate on the axis of the main liquid inlet pipe overlaps with an orthographic projection of the N-th one of the N liquid feeding pipes on the axis, an included angle between the deflecting inclined plate and the axis of the main liquid inlet pipe is less than 90 degrees, and a distance between a part of the deflecting inclined plate close to the first end and the N-th one of the N liquid feeding pipes is greater than a distance between a part of the deflecting inclined plate close to the second end and the N-th one of the N liquid feeding pipes.

For example, in the low-pressure liquid inlet manifold provided by an embodiment of the present disclosure, the included angle between the deflecting inclined plate and the axis of the main liquid inlet pipe ranges from 30 degrees to 60 degrees.

For example, the low-pressure liquid inlet manifold provided by an embodiment of the present disclosure further includes: an inclined plug, located at the second end, the deflecting inclined plate is located on the inclined plug.

For example, in the low-pressure liquid inlet manifold provided by an embodiment of the present disclosure, energy storage pressures of the N−1 auxiliary accumulators are different from each other.

For example, in the low-pressure liquid inlet manifold provided by an embodiment of the present disclosure, in the direction from the first end to the second end, the energy storage pressures of the N−1 auxiliary accumulators gradually decrease.

For example, in the low-pressure liquid inlet manifold provided by an embodiment of the present disclosure, in the direction from the first end to the second end, the energy storage pressures of the N−1 auxiliary accumulators gradually decrease, and an energy storage pressure of the end auxiliary accumulator is less than an energy storage pressure of the (N−1)-th one of the N−1 auxiliary accumulator.

For example, in the low-pressure liquid inlet manifold provided by an embodiment of the present disclosure, each of the auxiliary accumulators includes: a top plate, wherein the top plate is in contact with fluid in the main liquid inlet pipe and is configured to move along a movement direction; and a pressure applying portion, wherein the pressure applying portion is located on a side of the top plate away from the main liquid inlet pipe, and is configured to apply energy storage pressure to the top plate.

For example, in the low-pressure liquid inlet manifold provided by an embodiment of the present disclosure, an angle between the movement direction of the top plate and a corresponding extension direction of the liquid feeding pipe is less than 180 degrees.

For example, in the low-pressure liquid inlet manifold provided by an embodiment of the present disclosure, an angle between the movement direction of the top plate and the corresponding extension direction of the liquid feeding pipe is less than 150 degrees.

For example, in the low-pressure liquid inlet manifold provided by an embodiment of the present disclosure, a minimum distance between a surface of the top plate of the auxiliary accumulator close to the main liquid inlet pipe and the axis of the main liquid inlet pipe is greater than a radius of the main liquid inlet pipe.

For example, in the low-pressure liquid inlet manifold provided by an embodiment of the present disclosure, a surface of the top plate of the auxiliary accumulator close to the main liquid inlet pipe is a circular arc surface, and a radius of curvature of the circular arc surface is approximately equal to a radius of curvature of an inner wall of the main liquid inlet pipe.

For example, in the low-pressure liquid inlet manifold provided by an embodiment of the present disclosure, a surface of the top plate of the auxiliary accumulator close to the main liquid inlet pipe is a flat surface.

For example, in the low-pressure liquid inlet manifold provided by an embodiment of the present disclosure, the low-pressure liquid inlet manifold includes one auxiliary accumulator, the auxiliary accumulator extends from the second end into the main liquid inlet pipe, and extends toward the first end.

For example, in the low-pressure liquid inlet manifold provided by an embodiment of the present disclosure, in the direction from the first end to the second end, an orthographic projection of the first one of the N liquid feeding pipes on an axis of the main liquid inlet pipe overlaps with an orthographic projection of the auxiliary accumulator on the axis.

For example, in the low-pressure liquid inlet manifold provided by an embodiment of the present disclosure, the auxiliary accumulator further includes: a fixed pipe, including a hollow cavity; a pipe plug; and a pipe joint, one end of the fixed pipe is fixedly connected with the main liquid inlet pipe, the pressure applying portion is located in the hollow cavity, and the pipe plug is located on a side of the pressure applying portion away from the top plate, and is connected with the fixed pipe through the pipe joint.

For example, in the low-pressure liquid inlet manifold provided by an embodiment of the present disclosure, the pressure applying portion is an airbag, the auxiliary accumulator further includes an air intake pipe, the pipe plug includes a through hole, and the air intake pipe is connected to the airbag through the through hole.

For example, the low-pressure liquid inlet manifold provided by an embodiment of the present disclosure further includes a pressure gauge, configured to detect a gas pressure in the airbag.

For example, the low-pressure liquid inlet manifold provided by an embodiment of the present disclosure, further includes: a liquid supply pipe, wherein the liquid supply pipe is communicated with the first end of the main liquid inlet pipe, and is configured to provide low-pressure fluid to the main liquid inlet pipe; and a main accumulator, wherein the main accumulator is connected with the liquid supply pipe.

For example, the low-pressure liquid inlet manifold provided by an embodiment of the present disclosure further includes a purging pipe, the purging pipe is located at the second end of the main liquid inlet pipe and is communicated with the main liquid inlet pipe.

For example, in the low-pressure liquid inlet manifold provided by an embodiment of the present disclosure, a diameter of the first end of the main liquid inlet pipe is larger than a diameter of the second end of the main liquid inlet pipe, and in the direction from the first end to the second end, lengths of the N liquid feeding pipes gradually decrease.

At least one embodiment of the present disclosure further discloses a fracturing apparatus, which includes: a plunger pump, including a power end and a hydraulic end; and the abovementioned low-pressure liquid inlet manifold, the low-pressure liquid inlet manifold is connected with the hydraulic end, and is configured to provide low-pressure fluid to the plunger pump.

For example, in the fracturing apparatus provided by an embodiment of the present disclosure, the liquid end includes N fluid end chambers, the N liquid feeding pipes and the N fluid end chambers are arranged in one-to-one correspondence, and each of the liquid feeding pipes is configured to provide low-pressure fluid to a corresponding fluid end chamber.

For example, in the fracturing apparatus provided by an embodiment of the present disclosure, value of N is 5, 7, or 9.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

Figure 1:
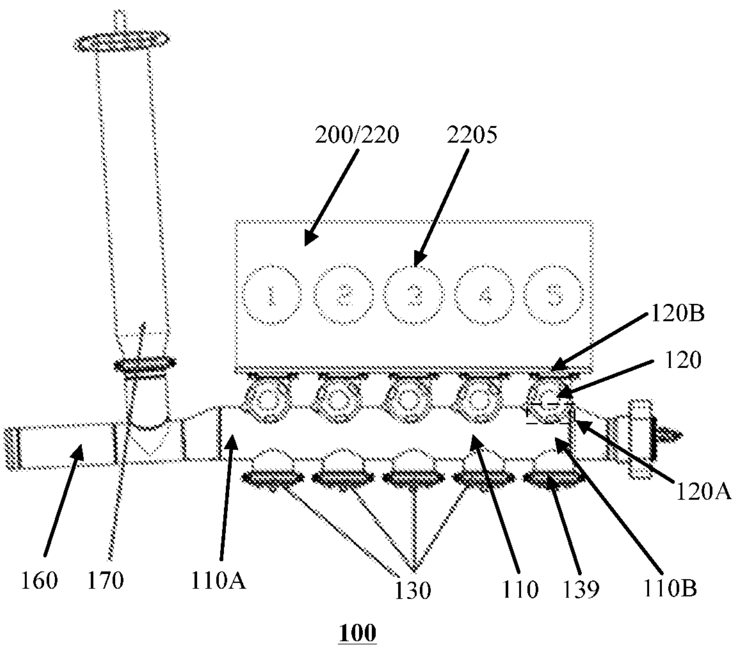
FIG. 1 is a schematic structural diagram of a low-pressure liquid inlet manifold provided by an embodiment of the present disclosure.

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect.

With the continuous development of technology, fracturing operations have put forward higher requirements on the flow and pressure of fracturing; in order to reduce equipment investment costs, use costs and maintenance costs, the oil and gas service companies reduce the number of fracturing trucks in a fracturing truck group, and increase the displacement and discharge pressure of a single fracturing truck, the oil and gas service companies have put forward higher requirements on the performance, service life and performance of the single fracturing truck.

The inventor(s) of the present disclosure noted that, for a single fracturing truck, the plunger pump faces the problems of fracturing air suction and sand deposition of the low-pressure liquid inlet manifold under the high-pressure and large displacement working conditions; the problem of fracturing air suction will reduce the service life of a hydraulic end of the plunger pump, while the problem of sand deposition of the low-pressure liquid inlet manifold will reduce the maintenance efficiency and increase maintenance costs. It should be noted, in the case where pressure of low-pressure fluid provided by the low-pressure liquid inlet manifold for the plunger pump is insufficient or fluctuates, the plunger pump may suck air, which leads to the problem of fracturing air suction.

In this regard, embodiments of the present disclosure provide a low-pressure liquid inlet manifold and a fracturing apparatus, the low-pressure liquid inlet manifold includes a main liquid inlet pipe and N liquid feeding pipes; the main liquid inlet pipe includes a first end and a second end that are arranged opposite to each other in an extension direction of the main liquid inlet pipe; the N liquid feeding pipes are arranged in sequence along a direction from the first end to the second end; each of the liquid feeding pipes includes a third end and a fourth end that are arranged opposite to each other in an extension direction of the each of the liquid feeding pipes, the third end is communicated with the main liquid inlet pipe, the fourth end is configured to provide low-pressure liquid to a plunger pump; the low-pressure liquid inlet manifold further includes at least one auxiliary accumulator, the at least one auxiliary accumulator is connected with the main liquid inlet pipe, and is arranged corresponding to at least one of the N liquid feeding pipes, an orthographic projection of the auxiliary accumulator on an axis of the main liquid inlet pipe overlaps with an orthographic projection of a corresponding liquid feeding pipe on the axis, N is a positive integer greater than or equal to 2. In this way, the low-pressure liquid inlet pipe is provided with at least one auxiliary accumulator corresponding to at least one of the N liquid feeding pipes on the main liquid inlet pipe, which can ensure stability of liquid supply pressure of the corresponding liquid feeding pipe in the case where pressure of the fluid in the main liquid inlet pipe is insufficient or fluctuates, so that the problem of fracturing air suction is avoided, and thus the service life and performance of the plunger pump can be improved. On the other hand, the auxiliary accumulator can play a role of preventing sand deposition to a certain extent. Therefore, the low-pressure liquid inlet manifold can further alleviate or even eliminate the problem of sand deposition.

Hereinafter, the low-pressure liquid inlet manifold and the fracturing apparatus provided by the embodiments of the present disclosure will be described in detail with reference to the accompanying drawings.

An embodiment of the present disclosure provides a low-pressure liquid inlet manifold. FIG. 1 is a schematic structural diagram of a low-pressure liquid inlet manifold provided by an embodiment of the present disclosure. As illustrated by FIG. 1, the low-pressure liquid inlet manifold 100 includes a main liquid inlet pipe 110 and N liquid feeding pipes 120; the main liquid inlet pipe 110 includes a first end 110A and a second end 110B that are arranged opposite to each other in an extension direction of the main liquid inlet pipe 110; the N liquid feeding pipes 120 are arranged in sequence along a direction from the first end 110A to the second end 110B; each of the liquid feeding pipes 120 includes a third end 120A and a fourth end 120B that are arranged opposite to each other in an extension direction of the each of the liquid feeding pipes 120, the third end 120A is communicated with the main liquid inlet pipe 110, the fourth end 120B is configured to provide low-pressure liquid to the plunger pump 200; the low-pressure liquid inlet manifold 100 further includes at least one auxiliary accumulator 130, the at least one auxiliary accumulator 130 is connected with the main liquid inlet pipe 110, and is arranged corresponding to at least one of the N liquid feeding pipes 120, and an orthographic projection of the auxiliary accumulator 130 on the axis of the main liquid inlet pipe 110 overlaps with an orthographic projection of a corresponding liquid feeding pipe 120 on the axis, in which N is a positive integer greater than or equal to 2. That is, in the case where the main liquid inlet pipe 110 is divided into multiple sections in the axial direction of the main liquid inlet pipe 110, and the auxiliary accumulator 130 and the corresponding liquid feeding pipe 120 are located in the same section or adjacent sections of the main liquid inlet pipe 110, so that the auxiliary accumulator 130 can correspondingly supplement fluid to the corresponding liquid feeding pipe 120.

In the low-pressure liquid inlet manifold provided by the embodiment of the present disclosure, the at least one auxiliary accumulator corresponding to at least one of the N liquid feeding pipes is arranged on the main liquid inlet pipe; in the case where the pressure of the fluid in the main liquid inlet pipe is insufficient or fluctuates, the auxiliary accumulator can ensure the stability of the liquid supply pressure of the corresponding liquid feeding pipe, so that the problem of fracturing air suction is avoided, and thus the service life and the performance of the plunger pump can be improved. On the other hand, in the case where the above mentioned auxiliary accumulator supplements the liquid supply pressure, compression and expansion actions of the auxiliary accumulator can play a role of preventing sand deposition; in addition, the auxiliary accumulator can ensure the stability of the pressure in the main liquid inlet pipe, so that the fluid in the main liquid inlet pipe can flow fully, and the auxiliary accumulator can also play a role of preventing sand deposition to a certain extent. Therefore, the low-pressure liquid inlet manifold can also alleviate or even eliminate the problem of sand deposition.

In some examples, as illustrated by FIG. 1, the low-pressure liquid inlet manifold 100 includes N−1 auxiliary accumulators 130, which are sequentially arranged along the direction from the first end 110A to the second end 110B; and the N liquid feeding pipes 120 are also sequentially arranged along the direction from the first end 110A to the second end 110B. In this case, in the direction from the first end 110A to the second end 110B, the first one of the N liquid feeding pipes 120 is arranged corresponding to the first one of the N−1 auxiliary accumulators 130, the i-th one of the N liquid feeding pipes 120 is arranged corresponding to the i-th one of the N−1 auxiliary accumulators 130, the (N−1)-th one of the N liquid feeding pipes 120 is arranged corresponding to the (N−1)-th one of the N−1 auxiliary accumulator 130, in which i is a positive integer greater than 1 and less than N−1. That is, the first one of the N liquid feeding pipes 120 to the (N−1)-th one of the N liquid feeding pipes 120 are arranged in one-to-one correspondence with the N−1 auxiliary accumulators 130. In this way, in the case where pressure of fluid in the main liquid inlet pipe is insufficient or fluctuates, the N−1 auxiliary accumulators can respectively supplement the fluid for the first one of the N liquid feeding pipes to the (N−1)-th one of the N liquid feeding pipes, to ensure the stability of the liquid supply pressure of the liquid feeding pipes, so that the problem of fracturing air suction can be better avoided. On the other hand, since the N−1 auxiliary accumulators are arranged in sequence from the first end to the second end, and are arranged corresponding to the first one of the N liquid feeding pipes to the (N−1)-th one of the N liquid feeding pipes, so that the problem of sand deposition can be reduced to a great extent.

In some examples, as illustrated by FIG. 1, the low-pressure liquid inlet manifold 100 further includes: an end auxiliary accumulator 139, which is connected with the main liquid inlet pipe 110, and is arranged corresponding to the N-th one of the N liquid feeding pipes 120, and an orthographic projection of the end auxiliary accumulator 139 on the axis of the main liquid inlet pipe 110 overlaps with an orthographic projection of the N-th one of the N liquid feeding pipes 120 on the axis. In this way, in the case where the pressure of the fluid in the main liquid inlet pipe is insufficient or fluctuates, the end auxiliary accumulator can correspondingly replenish fluid for the N-th one of the liquid feeding pipes.

In some examples, the above mentioned end auxiliary accumulator 139 and the auxiliary accumulator 130 may adopt the same structure; in this case, the end auxiliary accumulator 139 can be regarded as an auxiliary accumulator 130. In this case, the low-pressure liquid inlet manifold 100 includes N auxiliary accumulators 130, which are arranged in sequence from the first end 110A to the second end 110B; in the direction from the first end 110A to the second end 110B, the N auxiliary accumulators 130 and the N liquid feeding pipes 120 are arranged in one-to-one correspondence. Of course, the embodiments of the present disclosure include but are not limited thereto, and the end auxiliary accumulator 139 and the auxiliary accumulator 130 may also adopt different structures.

In some examples, as illustrated by FIG. 1, the storage pressures of the N−1 auxiliary accumulators 130 are different from each other. In the direction from the first end 110A to the second end 110B, as a distance between the liquid feeding pipe and the first end 110A increases, the liquid supply pressure of the liquid feeding pipes will also change accordingly. Therefore, by arranging N−1 auxiliary accumulators 130 to have different storage pressures, the low-pressure liquid inlet manifold can better ensure the liquid supply pressure of the liquid feeding pipe.

It should be noted that, the energy storage pressure of the N−1 auxiliary accumulators can be adjusted and arranged by detecting the actual liquid supply pressure (the actual effect played by the auxiliary accumulators) of the N liquid feeding pipes in the case where the pressure of the fluid in the main liquid inlet pipe is insufficient or fluctuates.

In some examples, as illustrated by FIG. 1, in the direction from the first end 110A to the second end 110B, the energy storage pressures of the N−1 auxiliary accumulators 130 gradually decrease. In this way, by arranging the energy storage pressures of the N−1 auxiliary accumulators to gradually decrease, the low-pressure liquid inlet manifold can better ensure the liquid supply pressure of the liquid feeding pipes.

In some examples, as illustrated by FIG. 1, in the case where the low-pressure liquid inlet manifold 100 includes the end auxiliary accumulator 139, in the direction from the first end 110A to the second end 110B, the energy storage pressures of the N−1 auxiliary accumulators 130 gradually decrease, the energy storage pressure of the end auxiliary accumulator 139 is less than the energy storage pressure of the (N−1)-th one of the N−1 auxiliary accumulators 130. That is, in the direction from the first end 110A to the second end 110B, the energy storage pressures of the N−1 auxiliary accumulators 130 and the end auxiliary accumulator 139 gradually decrease.

For example, as illustrated by FIG. 1, the low-pressure liquid inlet manifold 100 includes the main liquid inlet pipe 110 and five liquid feeding pipes 120; the five liquid feeding pipes 120 are sequentially arranged along the direction from the first end 110A to the second end 110B; and the five liquid feeding pipes 120 can be respectively connected with five fluid end chambers 2205 of a hydraulic end 220 of the plunger pump 200. That is, in the direction from the first end 110A to the second end 110B, one end of the first liquid feeding pipe 120 is connected with the main liquid inlet pipe 110, the other end of the first liquid feeding pipe 120 is connected with a first fluid end chamber 2205 of the hydraulic end 220, one end of the second liquid feeding pipe 120 is connected with the main liquid inlet pipe 110, the other end of the second liquid feeding pipe 120 is connected with a second fluid end chamber 2205 of the hydraulic end 220, one end of the third liquid feeding pipe 120 is connected with the main liquid inlet pipe 110, the other end the third liquid feeding pipe 120 is connected with a third fluid end chamber 2205 of the hydraulic end 220, one end of the fourth liquid feeding pipe 120 is connected with the main liquid inlet pipe 110, the other end of the fourth liquid feeding pipe 120 is connected with a fourth fluid end chamber 2205 of the hydraulic end 220, one end of the fifth liquid feeding pipe 120 is connected with the main liquid inlet pipe 110, the other end of the fifth liquid feeding pipe 120 is connected with a fifth fluid end chamber 2205 of the hydraulic end 220. Thus, the five liquid feeding pipes 120 can respectively provide low-pressure fluid to the five fluid end chambers 2205 of the hydraulic end 220.

As illustrated by FIG. 1, the low-pressure liquid inlet manifold 110 further includes five auxiliary accumulators 130 (the end auxiliary accumulator 139 is also regarded as an auxiliary accumulator 130), and the five auxiliary accumulators 130 are connected with the main liquid inlet pipe 110, and are arranged in one-to-one correspondence with the five liquid feeding pipes 120 mentioned above, an orthographic projection of each of the auxiliary accumulators 130 on the axis of the main liquid inlet pipe 110 overlaps with an orthographic projection of the corresponding liquid feeding pipe 120 on the axis. In this way, the five auxiliary accumulators 130 can respectively replenish fluid or fluid pressure to the five liquid feeding pipes 120, to ensure the stability of the liquid supply pressure of the liquid feeding pipes, so that the problem of fracturing air suction can be better avoided.

In some examples, as illustrated by FIG. 1, the above mentioned auxiliary accumulators 130 are detachably connected with the main liquid inlet pipe 110. In addition, the above mentioned end auxiliary accumulator 139 is also detachably connected with the main liquid inlet pipe 110. In this way, in the case where at least one of the auxiliary accumulators or the end auxiliary accumulator is damaged, the low-pressure liquid inlet manifold can be maintained immediately, to ensure a long-term stable operation of an apparatus including the low-pressure liquid inlet manifold. On the other hand, the auxiliary accumulators or the end auxiliary accumulator can also be removed in the case where the above auxiliary accumulators or the end auxiliary accumulator are not needed. Or, in the case where the above mentioned auxiliary accumulators have relatively large volumes, during the transportation of a fracturing apparatus using the above mentioned low-pressure liquid inlet manifold, the auxiliary accumulators can be removed, to facilitate transportation; after the fracturing apparatus using the above mentioned low-pressure liquid inlet manifold is transported to the designated position, the auxiliary accumulators can be installed.

In some examples, as illustrated by FIG. 1, the low-pressure liquid inlet manifold 100 further includes a liquid supply pipe 160 and a main accumulator 170; the liquid supply pipe 160 is communicated with a first end 110A of the main liquid inlet pipe 110, and is configured to provide low-pressure fluid to the main liquid inlet pipe 110; the main accumulator 170 is connected with the liquid supply pipe 160. In this case, the first end 110 of the main liquid inlet pipe 110 is a liquid inlet end; the main accumulator 170 can ensure that the pressure of the main liquid inlet pipe 110 is stable in the case where the pressure of the main liquid inlet pipe 110 is insufficient or the pressure fluctuates. It should be noted that if only the above mentioned main accumulator 170 is provided without the auxiliary accumulator 130, as a distance between the main accumulator 170 and the first end 110A increases, the main accumulator 170 cannot effectively and adequately replenish fluid or supply pressure for the liquid feeding pipe 120 that is far away from the main accumulator 170, thus problems such as insufficient liquid supply pressure may still exist. The low-pressure liquid inlet manifold provided in the present example stabilizes the pressure of the low-pressure fluid globally and locally by the combination and coordination of the main accumulator and the auxiliary accumulator, so that an excellent effect is provided.

Figure 2:
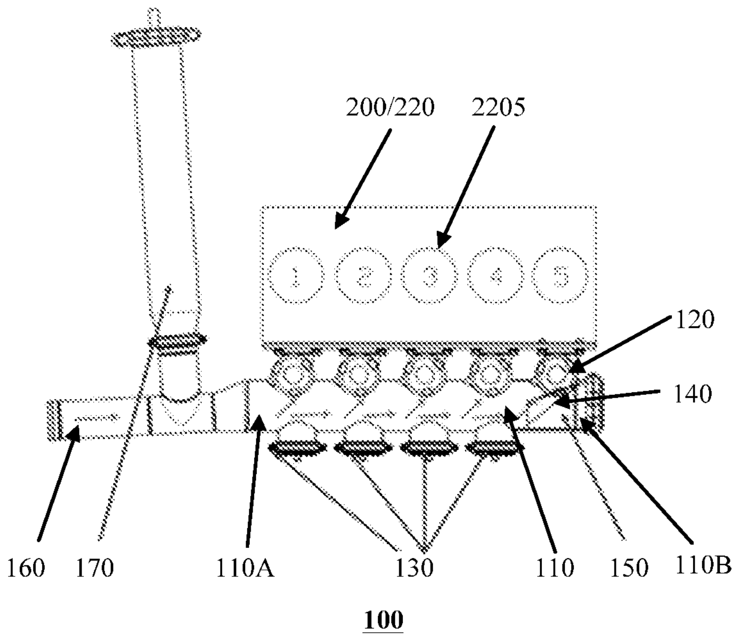
FIG. 2 is a schematic structural diagram of another low-pressure liquid inlet manifold provided by an embodiment of the present disclosure.

FIG. 2 is a schematic structural diagram of another low-pressure liquid inlet manifold provided by an embodiment of the present disclosure. As illustrated by FIG. 2, the low-pressure liquid inlet manifold 100 is not arranged with the above mentioned end auxiliary accumulator 139, that is, the N-th one of the N liquid feeding pipes 120 does not correspond to the auxiliary accumulator 130 or the end auxiliary accumulator 139. As illustrated by FIG. 1, the low-pressure liquid inlet manifold 100 further includes a deflecting inclined plate 140, the deflecting inclined plate 140 is located at the second end 110B, and is at least partially located in the main liquid inlet pipe 110. An orthographic projection of the deflecting inclined plate 140 on the axis of the main liquid inlet pipe 110 overlaps with an orthographic projection of the N-th one of the N liquid feeding pipes 120 on the axis, and an included angle between the deflecting inclined plate 140 and the axis of the main liquid inlet pipe 110 is less than 90 degrees. A distance between a part of the deflecting inclined plate 140 close to the first end 110A and the N-th one of the N liquid feeding pipes 120 is greater than a distance between a part of the deflecting inclined plate 140 close to the second end 110B and the N-th one of the N liquid feeding pipes 120. In this way, the deflecting inclined plate 140 can guide fluid in the main liquid inlet pipe 110 to the N-th one of the N liquid feeding pipes 120, so that an effect of ensuring the liquid supply pressure of the N-th one of the N liquid feeding pipes 120 can be achieved. In addition, compared with the case where the N-th one of the N liquid feeding pipes 120 is also arranged with the auxiliary accumulator 130 or the end auxiliary accumulator 139, because the deflecting inclined plate 140 has the advantages of simple structure, simple maintenance, and low cost, the low-pressure liquid inlet manifold can improve the service life and performance of the plunger pump by the combination of the auxiliary accumulator 130 and the deflecting inclined plate 140, and alleviate or even eliminate the problem of sand deposition, at the same time, the low-pressure liquid inlet manifold has lower maintenance difficulty and lower costs.

In some examples, as illustrated by FIG. 2, the included angle between the deflecting inclined plate 140 and the axis of the main liquid inlet pipe 110 is in the range of from 30 degrees to 60 degrees. In this way, the deflecting inclined plate 140 has a better guiding effect, and can better ensure the liquid supply pressure of the N-th one of the N liquid feeding pipes. Of course, the embodiments of the present disclosure include but are not limited thereto, the included angle between the deflecting inclined plate and the axis of the main liquid inlet pipe can be arranged according to actual conditions.

In some examples, as illustrated by FIG. 2, the N−1 auxiliary accumulators 130 have different storage pressures.

In the direction from the first end 110A to the second end 110B, as the distance between the liquid feeding pipe and the first end 110A increases, the liquid supply pressures of the liquid feeding pipes will also change accordingly. Therefore, by arranging N−1 auxiliary accumulators 130 to have different energy storage pressures, the low-pressure liquid inlet manifold can better ensure the liquid supply pressures of the liquid feeding pipes.

It should be noted that, the energy storage pressures of the N−1 auxiliary accumulators can be adjusted and arranged by detecting actual supply pressures (that is, actual effect of the auxiliary accumulators) of the N liquid feeding pipes in the case where the pressure of the fluid in the main liquid inlet pipe is insufficient or fluctuating.

In some examples, as illustrated by FIG. 2, in the direction from the first end 110A to the second end 110B, the energy storage pressures of the N−1 auxiliary accumulators 130 gradually decrease. In this way, by arranging the energy storage pressures of the N−1 auxiliary accumulators to gradually decrease, the low-pressure liquid inlet manifold can better ensure the liquid supply pressure of the liquid feeding pipes.

In some examples, as illustrated by FIG. 2, the low-pressure liquid inlet manifold 100 further includes an inclined plug 150, and the inclined plug 150 is located at the second end 110B and is used to block the second end 110B. In this case, the deflecting inclined plate 140 is located on the inclined plug 150. Therefore, the low-pressure liquid inlet manifold can reduce the difficulty of installation and maintenance of the deflecting inclined plate by arranging the deflecting inclined plate on the inclined plug.

For example, as illustrated by FIG. 2, the low-pressure liquid inlet manifold 100 includes the main liquid inlet pipe 110 and five liquid feeding pipes 120; the five liquid feeding pipes 120 are sequentially arranged along the direction from the first end 110A to the second end 110B; and the five liquid feeding pipes 120 can be respectively connected with five fluid end chambers 2205 of the hydraulic end 220 of the plunger pump 200. That is, in the direction from the first end 110A to the second end 110B, one end of the first liquid feeding pipe 120 is connected with the main liquid inlet pipe 110, the other end of the first liquid feeding pipe 120 is connected with the first fluid end chamber 2205 of the hydraulic end 220, one end of the second liquid feeding pipe 120 is connected with the main liquid inlet pipe 110, the other end of the second liquid feeding pipe 120 is connected with the second fluid end chamber 2205 of the hydraulic end 220, one end of the third liquid feeding pipe 120 is connected with the main liquid inlet pipe 110, and the other end of the third liquid feeding pipe 120 is connected with the third fluid end chamber 2205 of the hydraulic end 220, one end of the fourth liquid feeding pipe 120 is connected with the main liquid inlet pipe 110, and the other end of the fourth liquid feeding pipe 120 is connected with the fourth fluid end chamber 2205 of the hydraulic end 220, one end of the fifth liquid feeding pipe 120 is connected with the main liquid inlet pipe 110, and the other end of the fifth liquid feeding pipe 120 is connected with the fifth fluid end chamber 2205 of the hydraulic end 220. In this way, the five liquid feeding pipes 120 can respectively provide low-pressure fluid to the five fluid end chambers 2205 of the hydraulic end 220.

As illustrated by FIG. 2, the low-pressure liquid inlet manifold 110 further includes four auxiliary accumulators 130, and the four auxiliary accumulators 130 are respectively connected with the main liquid inlet pipe 110; in the direction from the first end 110A to the second end 110B, the four auxiliary accumulators 130 are arranged in one-to-one correspondence with the front four liquid feeding pipes 120, an orthographic projection of each of the four auxiliary accumulators 130 on the axis of the main liquid inlet pipe 110 overlaps with an orthographic projection of the corresponding liquid feeding pipe 120 on the axis. In this way, the four auxiliary accumulators 130 can respectively supplement fluid or fluid pressure to the four liquid feeding pipes 120, and the liquid supply pressure of the fifth liquid feeding pipe 120 can be ensured by the deflecting inclined plate 140. In this way, the low-pressure liquid inlet manifold can improve the service life and performance of the plunger pump through the combination of the four auxiliary accumulators 130 and the deflecting inclined plate 140, and alleviates or even eliminates the problem of sand deposition, and at the same time, the low-pressure liquid inlet manifold has lower maintenance difficulty and lower cost.

It should be noted that, although the low-pressure liquid inlet manifold shown in FIGS. 1 and 2 both adopt a scheme of one auxiliary accumulator corresponding to one liquid feeding pipe, the embodiments of the present disclosure include but are not limited thereto. In the case where the performance of the auxiliary accumulator is good, one auxiliary accumulator can also correspond to multiple liquid feeding pipes, which is used to replenish fluid for multiple liquid feeding pipes or to ensure the stability of liquid supply pressure. In addition, although five liquid feeding pipes are provided shown in FIG. 1 and FIG. 2, the embodiments of the present disclosure include but are not limited thereto.

Figure 3:
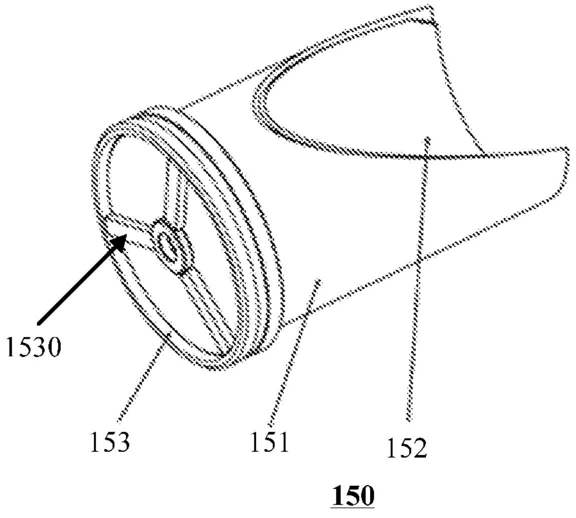
FIG. 3 is a schematic structural diagram of an inclined plug provided by an embodiment of the present disclosure.

FIG. 3 is a schematic structural diagram of an inclined plug provided by an embodiment of the present disclosure. As illustrated by FIG. 3, the inclined plug 150 includes a straight pipe 151 and an inclined pipe 152 located inside the straight pipe 151, and the deflecting inclined plate 140 is arranged on the inclined pipe 152, in this case, a plane shape of the deflecting inclined plate 140 may be an ellipse, that is, a shape of an inclined section of the inclined pipe 152, so that better diversion can be performed.

In some examples, as illustrated by FIG. 3, the inclined plug 150 further includes a plug 153 at one end of the straight pipe 151. A handle 1530 can be arranged on the plug 153 to facilitate disassembly and assembly.

Figure 4:
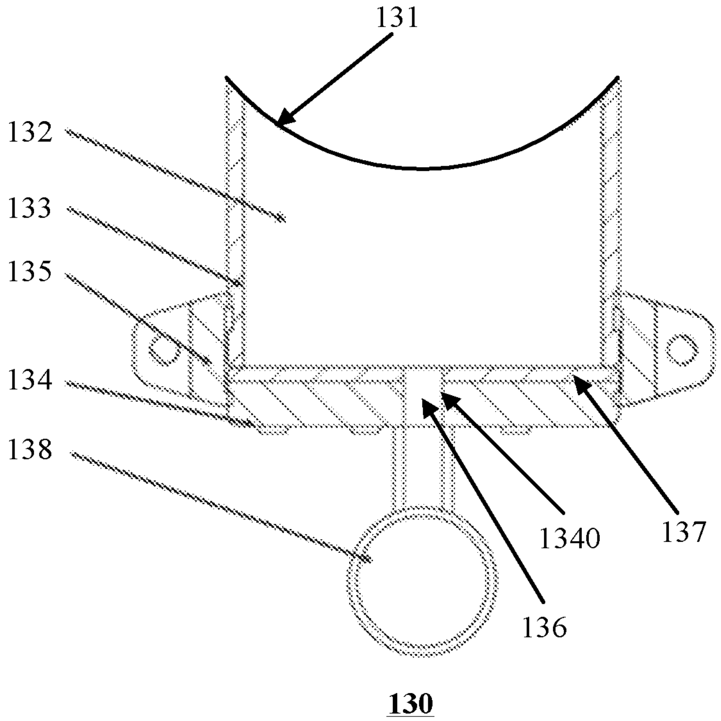
FIG. 4 is a schematic structural diagram of still another low-pressure liquid inlet manifold provided by an embodiment of the disclosure.

FIG. 4 is a schematic structural diagram of an auxiliary accumulator provided by an embodiment of the present disclosure. As illustrated by FIG. 4, the auxiliary accumulator 130 includes a top plate 131 and a pressure applying portion 132; the top plate 131 is in contact with the fluid in the main liquid inlet pipe 110 and can move along a movement direction; the pressure applying portion 132 is located on a side of the top plate 131 away from the main liquid inlet pipe 110 and is configured to apply energy storage pressure to the top plate 131. In this way, in the case where the fluid pressure in the main liquid inlet pipe 110 is high, the top plate 131 can be pushed to move away from the main liquid inlet pipe 110, so that the fluid pressure in the main liquid inlet pipe 110 is reduced; in the case where the fluid pressure in the main liquid inlet pipe 110 is insufficient, the pressure applying portion 132 can push the top plate 131 to move to a center of the main liquid inlet pipe 110, to replenish fluid to the corresponding liquid feeding pipe 120, so that the supply pressure of the corresponding liquid feeding pipe 120 is ensured.

In some examples, as illustrated by FIG. 4, the auxiliary accumulator 130 further includes a fixed pipe 133, a pipe plug 134 and a pipe joint 135; the fixed pipe 133 includes a hollow cavity 1330; one end of the fixed pipe 133 is fixedly connected with the main liquid inlet pipe 110, the pressure applying portion 132 is located in the hollow cavity 1330, the pipe plug 134 is located on a side of the pressure applying portion 132 away from the top plate 131, and is connected with the fixed pipe 133 through the pipe joint 135.

In some examples, as illustrated by FIG. 4, the pressure applying portion 132 is an airbag, gas in the airbag can be nitrogen; the auxiliary accumulator 130 further includes an air inlet pipe 136, the pipe plug 134 includes a through hole 1340, the air inlet pipe 136 is connected with the airbag 132 through the through hole 1340, so that the airbag can be inflated or deflated through the air inlet pipe 136, to adjust the pressure generated by the airbag 132.

In some examples, as illustrated by FIG. 4, the auxiliary accumulator 130 further includes a buffer layer 137, which is located between the pressure applying portion 132 and the pipe plug 134, so as to protect the airbag.

In some examples, as illustrated by FIG. 4, the auxiliary accumulator 130 further includes a pressure gauge 138, which is configured to detect the gas pressure in the airbag 132.

In some examples, as illustrated by FIG. 4, a surface of the top plate 131 of the auxiliary accumulator 130 close to the main liquid inlet pipe 110 is a circular arc surface, and a radius of curvature of the circular arc surface is approximately equal to a radius of curvature of an inner wall of the main liquid inlet pipe, so that the influence of the arrangement of the auxiliary accumulator on the fluid in the main liquid inlet pipe can be reduced.

Figure 5:
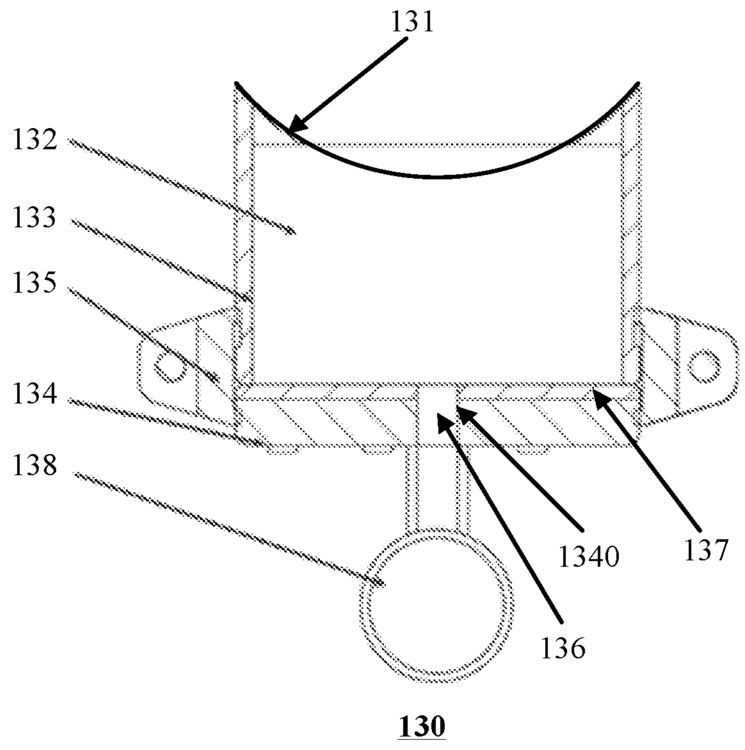
FIG. 5 is a schematic structural diagram of an auxiliary accumulator provided by an embodiment of the present disclosure.

Of course, regarding the shape of the surface of the top plate of the auxiliary accumulator close to the main liquid inlet pipe, the embodiments of the present disclosure include, but are not limited to the circular arc surface. FIG. 5 is a schematic structural diagram of another auxiliary accumulator provided by an embodiment of the present disclosure. As illustrated by FIG. 5, the surface of the top plate 131 of the auxiliary accumulator 130 close to the main liquid inlet pipe 110 further includes a flat surface.

It should be noted that, in the case where the above mentioned end accumulator and the auxiliary accumulators adopt a same structure, the structure of the end accumulator can also refer to the related descriptions of FIG. 4.

In some examples, as illustrated by FIGS. 1 and 2, a minimum distance between the surface of the top plate 131 of the auxiliary accumulator 130 close to the main liquid inlet pipe and the axis of the main liquid inlet pipe 110 is greater than the radius of the main liquid inlet pipe 110. That is, a part of the auxiliary accumulator 130 located inside the main liquid inlet pipe 110 cannot exceed an inner surface of the main liquid inlet pipe 110. In this way, the top plate 131 of the auxiliary accumulator 130 will not extend into the main liquid inlet pipe 110, to avoid obstructions to the flow of fluid.

In some examples, as illustrated by FIGS. 1 and 2, in a direction of gravity, the liquid feeding pipe 120 is arranged at a top of the main liquid inlet pipe 110, and the auxiliary accumulator 130 is arranged at a bottom of the main liquid inlet pipe 110; in this case, an included angle between the movement direction of the top plate 131 and the extension direction of the corresponding liquid feeding pipe 120 is approximately 180 degrees.

Figure 6:
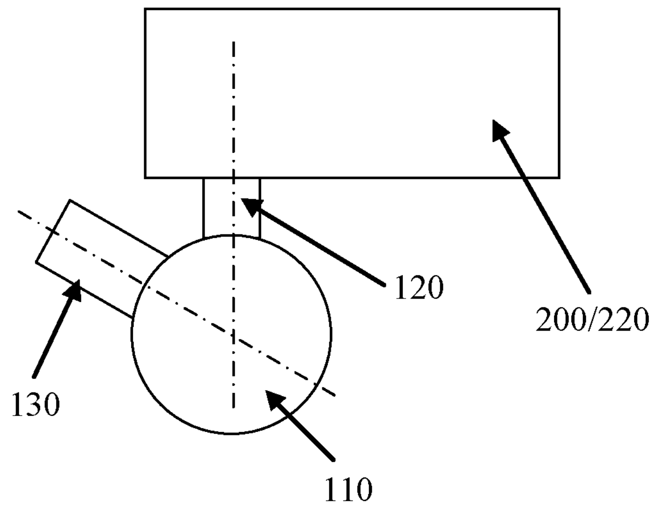
FIG. 6 is a schematic structural diagram of still another low-pressure liquid inlet manifold provided by an embodiment of the present disclosure.

FIG. 6 is a schematic structural diagram of still another low-pressure liquid inlet manifold provided by an embodiment of the present disclosure. As illustrated by FIG. 6, an angle between the movement direction of the top plate 131 and the extension direction of the corresponding liquid feeding pipe 120 is less than 180 degrees. That is, the auxiliary accumulator 130 is not arranged at the bottom of the main liquid inlet pipe 110, but on the side surface of the main liquid inlet pipe 110, so that erosion and wear of the gravel to the auxiliary accumulator can be reduced.

In some examples, as illustrated by FIG. 6, the included angle between the movement direction of the top plate and the extension direction of the corresponding liquid feeding pipe is less than 150 degrees; for another example, the included angle between the movement direction of the top plate and the extension direction of the corresponding liquid feeding pipe is less than 90 degrees.

Figure 7:
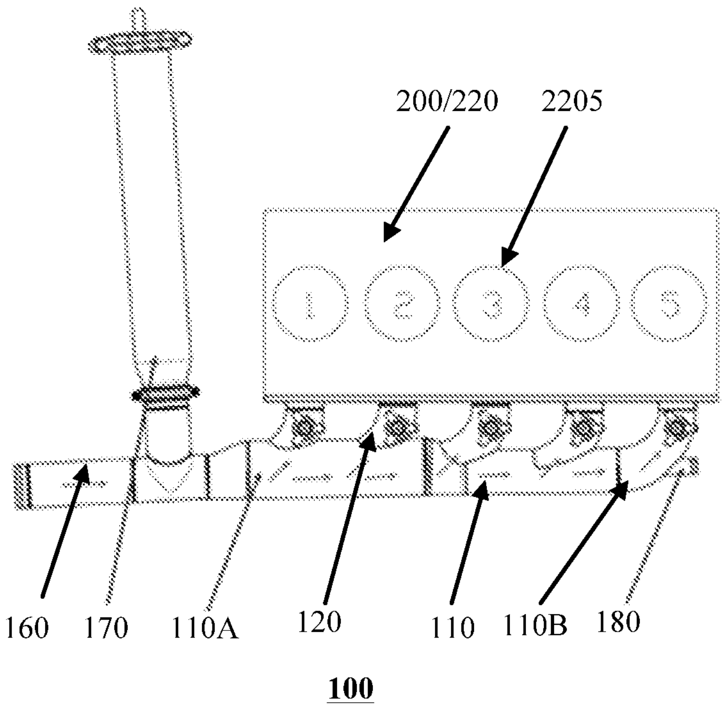
FIG. 7 is a schematic structural diagram of still another low-pressure liquid inlet manifold provided by an embodiment of the present disclosure.

FIG. 7 is a schematic structural diagram of still another low-pressure liquid inlet manifold provided by an embodiment of the present disclosure. As illustrated by FIG. 7, the low-pressure liquid inlet manifold 100 further includes a liquid supply pipe 160 and a main accumulator 170; the liquid supply pipe 160 is communicated with the first end 110A of the main liquid inlet pipe 110, and is configured to provide low-pressure fluid to the main liquid inlet pipe 110; the main accumulator 170 is connected with the liquid supply pipe 160. In this case, the first end 110 of the main liquid inlet pipe 110 is a liquid inlet end; the main accumulator 170 can ensure that the pressure of the main liquid inlet pipe 110 is stable in the case where the pressure of the main liquid inlet pipe 110 is insufficient or the pressure fluctuates. It should be noted that, although the low-pressure liquid inlet manifold shown in FIG. 6 does not show the auxiliary accumulator, the low-pressure liquid inlet manifold can also be arranged with the above mentioned auxiliary accumulators and the end auxiliary accumulator.

In some examples, as illustrated by FIG. 7, the low-pressure liquid inlet manifold 100 further includes a purging pipe 180, the purging pipe 180 is located at the second end 110B of the main liquid inlet pipe 110 and is communicated with the main liquid inlet pipe 110. In this way, in the case where the low-pressure liquid inlet manifold is out of service or there is gravel in the low-pressure liquid inlet manifold, purge gas can be introduced into the purging pipe 180, to blow out the gravel or residual moisture in the low-pressure liquid inlet manifold.

In some examples, as illustrated by FIG. 7, a diameter of the first end 110A of the main liquid inlet pipe 110 is larger than a diameter of the second end 110B of the main liquid inlet pipe 110, in the direction from the first end 110A to the second end 110B, lengths of the N liquid feeding pipes gradually decrease. As the fluid in the main liquid inlet pipe continuously enters the plunger pump from the liquid feeding pipes, a flow rate of the main liquid inlet pipe gradually decreases. The main liquid inlet pipe in the low-pressure liquid inlet manifold provided in the example is a reducing pipe, so that it can ensure that flow and pressure of a connection position of each of the liquid feeding pipes and the curved liquid feeding pipes and the main liquid inlet pipe are stable, to reduce a generation of cavitation, and thus it can avoid the problem of fracturing air suction and restrain the generation of vibration. On the other hand, as the lengths of the liquid feeding pipes gradually decrease from the first end of the main liquid inlet pipe to the second end of the main liquid inlet pipe, the main liquid inlet pipe has an upwardly inclined angle with respect to the horizontal direction, so that the settlement caused by horizontal transportation can be reduced.

Figure 8:
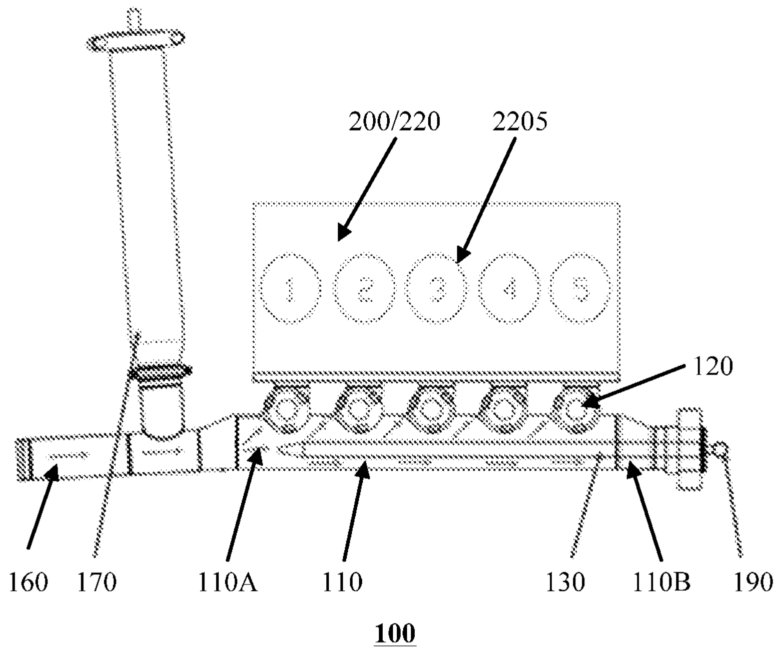
FIG. 8 is a schematic structural diagram of still another low-pressure liquid inlet manifold provided by an embodiment of the present disclosure.

FIG. 8 is a schematic structural diagram of still another low-pressure liquid inlet manifold provided by an embodiment of the present disclosure. As illustrated by FIG. 8, the low-pressure liquid inlet manifold 100 includes an auxiliary accumulator 130, and the auxiliary accumulator 130 extends from the second end 110B into the low-pressure liquid inlet manifold 110, and extends to the first end 110A.

In some examples, as illustrated by FIG. 8, in the direction from the first end 110A to the second end 110B, an orthographic projection of the first one of the N liquid feeding pipes 120 on the axis of the main liquid inlet pipe 110 overlaps with an orthographic projection of the auxiliary accumulator 130 on the axis. In this way, in the working process, after the fluid enters the main liquid inlet pipe, the fluid will contact the auxiliary accumulator, so that the auxiliary accumulator buffers the fluid in the entire liquid inlet main pipe.

In some examples, as illustrated by FIG. 8, an end of the auxiliary accumulator 130 away from the second end 110B includes an inclined surface, so that the fluid can be better buffered, to avoid obstructions to the flow of fluid.

Figure 9:
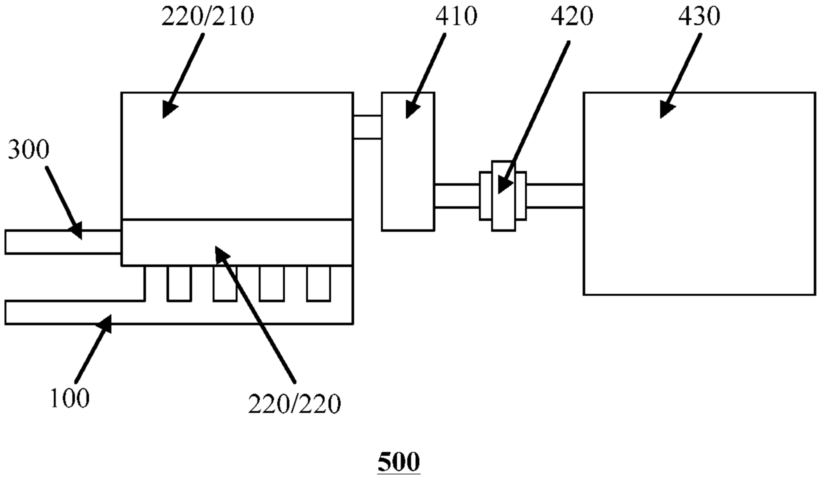
FIG. 9 is a schematic diagram of a fracturing apparatus provided by an embodiment of the present disclosure.

An embodiment of the present disclosure further provides a fracturing apparatus. FIG. 9 is a schematic diagram of a fracturing apparatus provided by an embodiment of the present disclosure. As illustrated by FIG. 9, the fracturing apparatus 500 includes a plunger pump 200 and the above mentioned low-pressure liquid inlet manifold 100; the plunger pump 200 includes a power end 210 and a hydraulic end 220; and the low-pressure liquid inlet manifold 100 is connected with the hydraulic end 220 and is configured to provide low-pressure fluid to the plunger pump 200. In this way, the at least one auxiliary accumulator corresponding to at least one of the N liquid feeding pipes is arranged on the main liquid inlet pipe; in the case where the pressure of the fluid in the main liquid inlet pipe is insufficient or fluctuates, the auxiliary accumulator can ensure the stability of the liquid supply pressure of the corresponding liquid feeding pipe, so that the problem of fracturing air suction can be avoided, and thus the service life and performance of the plunger pump can be improved. On the other hand, in the case where the above mentioned auxiliary accumulator supplements the liquid supply pressure, compression and expansion actions of the auxiliary accumulator can play a role of preventing sand deposition; in addition, the auxiliary accumulator can ensure that the pressure in the main liquid inlet pipe is stable, so that the fluid in the main liquid inlet pipe can flow fully, and the auxiliary accumulator can also play a role of preventing sand deposition to a certain extent. Therefore, the low-pressure liquid inlet manifold can also alleviate or even eliminate the problem of sand deposition.

For example, a shell of the power end and a shell of the hydraulic end can be fixedly connected by bolts, etc. Of course, the embodiments of the present disclosure include but are not limited thereto, and other connection methods may also be adopted to realize the fixed connection of the above mentioned components.

For example, the power end includes a crankshaft connecting rod mechanism and a plunger, the crankshaft connecting rod mechanism can convert a rotary motion into a reciprocating motion of the plunger, at least a part of the plunger can extend into the hydraulic end, to pressurize the low-pressure fluid in the hydraulic end. It should be noted that, the structure and working mode of the plunger pump are briefly described above, however, the plunger pump of the embodiment of the present disclosure includes but is not limited to the above mentioned structure and working mode.

In some examples, as illustrated by FIG. 8, the hydraulic end 220 includes N fluid end chambers 2205, N liquid feeding pipes 120 and N fluid end chambers 2205 are arranged in one-to-one correspondence, and each of the liquid feeding pipes 120 is configured to provide low-pressure fluid to the corresponding fluid end chamber 2205.

For example, the value of N is 5, 7, or 9. That is, the plunger pump 200 may be a five-chamber plunger pump, a seven-chamber plunger pump, and a nine-chamber plunger pump. Of course, the embodiments of the present disclosure include but are not limited thereto, and the plunger pump may also be a plunger pump with other fluid end chamber numbers.

In some examples, as illustrated by FIG. 9, the fracturing apparatus 500 further includes a high-pressure discharge manifold 300, a gear box 410, a coupling 410, and a prime mover 430. The prime mover 430 is connected with the gear box 410 through the coupling 410, and the gear box 410 is connected with the power end 210 of the plunger pump 200, in this way, after power output by the prime mover 430 is decelerated by the gear box 410, the power is transmitted to the power end 210 of the plunger pump 200. The power end 210 of the plunger pump 200 converts the power provided by the prime mover 430 into the reciprocating motion of the plunger; the low-pressure liquid inlet manifold 100 is connected with the hydraulic end 220 of the plunger pump 200, and provides low-pressure fluid, such as fracturing fluid, to the hydraulic end 220; the hydraulic end 220 can use the reciprocating movement of the plunger to pressurize the low-pressure fluid to form high-pressure fracturing fluid; the high-pressure discharge manifold 300 is connected with the hydraulic end 220 of the plunger pump 200 and is used to discharge the high-pressure fracturing fluid. In this way, the fracturing apparatus can provide high-pressure fracturing fluid, and then to be used in fracturing operations.

For example, the above mentioned prime mover may be an equipment that provides power such as a diesel engine, an electric motor, or a turbine engine. In addition, due to a high speed of the prime mover (especially the electric motor and the turbine engine), a reduction box is necessary to be installed between the plunger pump and the prime mover, so that the reduction box is used to decelerate the power output by the prime mover, to match the plunger pump.

In some examples, the fracturing apparatus may be a fracturing truck, a fracturing skid, or other equipment used to generate high-pressure fracturing fluid. The following points required to be explained:

(1) the drawings of the embodiments of the present disclosure only relate to the structures related to the embodiments of the present disclosure, and other structures can refer to the general design.

(2) without conflict, the embodiments of the present disclosure and the features in the embodiments may be combined with each other.

The present application claims the priority of Chinese patent application No. 202110080048.8 filed on Jan. 21, 2021, and the disclosure of which is incorporated herein by reference in its entirety as part of the present application.

What is claimed is:

1. A low-pressure liquid inlet manifold, comprising:

a main liquid inlet pipe, comprising a first end and a second end that are arranged opposite to each other in an extension direction of the main liquid inlet pipe;

N liquid feeding pipes, arranged in sequence along a direction from the first end to the second end, wherein each of the N liquid feeding pipes comprises a third end and a fourth end that are arranged opposite to each other in an extension direction of the each of the N liquid feeding pipes, the third end is communicated with the main liquid inlet pipe, and the fourth end is configured to provide low-pressure liquid to a plunger pump; and at least one auxiliary accumulator, the at least one auxiliary accumulator being connected with the main liquid inlet pipe and arranged corresponding to at least one of the N liquid feeding pipes, an orthographic projection of the auxiliary accumulator on an axis of the main liquid inlet pipe overlapping with an orthographic projection of a corresponding liquid feeding pipe on the axis, and N being a positive integer greater than or equal to 2, wherein each of the at least one auxiliary accumulator comprises:

a top plate in contact with fluid in the main liquid inlet pipe and configured to move along a movement direction; and a pressure applying portion located on a side of the top plate away from the main liquid inlet pipe, and configured to apply energy storage pressure to the top plate.

2. The low-pressure liquid inlet manifold according to claim 1, wherein the low-pressure liquid inlet manifold comprises N−1 auxiliary accumulators, and the N−1 auxiliary accumulators are sequentially arranged along the direction from the first end to the second end; and in the direction from the first end to the second end, a first one of the N liquid feeding pipes is arranged corresponding to a first one of the N−1 auxiliary accumulators, an i-th one of the N liquid feeding pipes is arranged corresponding to an i-th one of the N−1 auxiliary accumulators, an (N−1)-th one of the N liquid feeding pipes is arranged corresponding to an (N−1)-th one of the N−1 auxiliary accumulators, and i is a positive integer greater than 1 and less than N−1.

3. The low-pressure liquid inlet manifold according to claim 2, further comprising:

a deflecting inclined plate, located at the second end and at least partly located in the main liquid inlet pipe, wherein an orthographic projection of the deflecting inclined plate on the axis of the main liquid inlet pipe overlaps with an orthographic projection of the N-th one of the N liquid feeding pipes on the axis, an included angle between the deflecting inclined plate and the axis of the main liquid inlet pipe is less than 90 degrees, and a distance between a part of the deflecting inclined plate close to the first end and the N-th one of the N liquid feeding pipes is greater than a distance between a part of the deflecting inclined plate close to the second end and the N-th one of the N liquid feeding pipes.

4. The low-pressure liquid inlet manifold according to claim 3, wherein the included angle between the deflecting inclined plate and the axis of the main liquid inlet pipe ranges from 30 degrees to 60 degrees.

5. The low-pressure liquid inlet manifold according to claim 3, further comprising:

an inclined plug, located at the second end, wherein the deflecting inclined plate is located on the inclined plug.

6. The low-pressure liquid inlet manifold according to claim 2, wherein energy storage pressures of the N−1 auxiliary accumulators are different from each other.

7. The low-pressure liquid inlet manifold according to claim 6, wherein in the direction from the first end to the second end, the energy storage pressures of the N−1 auxiliary accumulators gradually decrease.

8. The low-pressure liquid inlet manifold according to claim 1, wherein an angle between the movement direction of the top plate and a corresponding extension direction of the N liquid feeding pipes is less than 180 degrees.

9. The low-pressure liquid inlet manifold according to claim 1, wherein a minimum distance between a surface of the top plate of the auxiliary accumulator close to the main liquid inlet pipe and the axis of the main liquid inlet pipe is greater than a radius of the main liquid inlet pipe.

10. The low-pressure liquid inlet manifold according to claim 1, wherein a surface of the top plate of the auxiliary accumulator close to the main liquid inlet pipe is a circular arc surface, and a radius of curvature of the circular arc surface is approximately equal to a radius of curvature of an inner wall of the main liquid inlet pipe.

11. The low-pressure liquid inlet manifold according to claim 1, wherein the low-pressure liquid inlet manifold comprises one additional auxiliary accumulator, the additional auxiliary accumulator extends from the second end into the main liquid inlet pipe, and extends toward the first end.

12. The low-pressure liquid inlet manifold according to claim 11, wherein, in the direction from the first end to the second end, an orthographic projection of the first one of the N liquid feeding pipes on an axis of the main liquid inlet pipe overlaps with an orthographic projection of the auxiliary accumulator on the axis.

13. The low-pressure liquid inlet manifold according to claim 1, wherein the auxiliary accumulator further comprises:

a fixed pipe, comprising a hollow cavity;

a pipe plug; and a pipe joint, wherein one end of the fixed pipe is fixedly connected with the main liquid inlet pipe, the pressure applying portion is located in the hollow cavity, and the pipe plug is located on a side of the pressure applying portion away from the top plate, and is connected with the fixed pipe through the pipe joint.

14. The low-pressure liquid inlet manifold according to claim 13, wherein the pressure applying portion is an airbag, the auxiliary accumulator further comprises an air intake pipe, the pipe plug comprises a through hole, and the air intake pipe is connected to the airbag through the through hole.

15. The low-pressure liquid inlet manifold according to claim 1, further comprising:

a liquid supply pipe, wherein the liquid supply pipe is communicated with the first end of the main liquid inlet pipe, and is configured to provide low-pressure fluid to the main liquid inlet pipe; and a main accumulator, wherein the main accumulator is connected with the liquid supply pipe.

16. The low-pressure liquid inlet manifold according to claim 15, wherein a diameter of the first end of the main liquid inlet pipe is larger than a diameter of the second end of the main liquid inlet pipe, and in the direction from the first end to the second end, lengths of the N liquid feeding pipes gradually decrease.

17. A fracturing apparatus, comprising:

a plunger pump, comprising a power end and a hydraulic end; and the low-pressure liquid inlet manifold according to claim 1, wherein the low-pressure liquid inlet manifold is connected with the hydraulic end, and is configured to provide low-pressure fluid to the plunger pump.

18. A low-pressure liquid inlet manifold, comprising:

a main liquid inlet pipe, comprising a first end and a second end that are arranged opposite to each other in an extension direction of the main liquid inlet pipe;

N liquid feeding pipes, arranged in sequence along a direction from the first end to the second end, wherein each of the N liquid feeding pipes comprises a third end and a fourth end that are arranged opposite to each other in an extension direction of the each of the N liquid feeding pipes, the third end is communicated with the main liquid inlet pipe, and the fourth end is configured to provide low-pressure liquid to a plunger pump; and at least one auxiliary accumulator, the at least one auxiliary accumulator being connected with the main liquid inlet pipe and arranged corresponding to at least one of the N liquid feeding pipes, an orthographic projection of the auxiliary accumulator on an axis of the main liquid inlet pipe overlapping with an orthographic projection of a corresponding liquid feeding pipe on the axis, and N being a positive integer greater than or equal to 2, wherein the low-pressure liquid inlet manifold comprises N−1 auxiliary accumulators, and the N−1 auxiliary accumulators are sequentially arranged along the direction from the first end to the second end;

wherein in the direction from the first end to the second end, a first one of the N liquid feeding pipes is arranged corresponding to a first one of the N−1 auxiliary accumulators, an i-th one of the N liquid feeding pipes is arranged corresponding to an i-th one of the N−1 auxiliary accumulators, an (N−1)-th one of the N liquid feeding pipes is arranged corresponding to an (N−1)-th one of the N−1 auxiliary accumulators, and i is a positive integer greater than 1 and less than N−1; and wherein the low-pressure liquid inlet manifold further comprises: an end auxiliary accumulator, wherein the end auxiliary accumulator is connected with the main liquid inlet pipe and is arranged corresponding to the N-th one of the N liquid feeding pipes, and an orthographic projection of the end auxiliary accumulator on the axis of the main liquid inlet pipe overlaps with an orthographic projection of the N-th one of the N liquid feeding pipes on the axis.

19. The low-pressure liquid inlet manifold according to claim 18, wherein in the direction from the first end to the second end, energy storage pressures of the N−1 auxiliary accumulators gradually decrease, and an energy storage pressure of the end auxiliary accumulator is less than an energy storage pressure of the (N−1)-th one of the N−1 auxiliary accumulators.

20. A fracturing apparatus, comprising:

a plunger pump, comprising a power end and a hydraulic end; and the low-pressure liquid inlet manifold according to claim 18, wherein the low-pressure liquid inlet manifold is connected with the hydraulic end, and is configured to provide low-pressure fluid to the plunger pump.

* * * * *